US012612865B2

(12) United States Patent
Nizami et al.

(10) Patent No.: US 12,612,865 B2
(45) Date of Patent: Apr. 28, 2026

(54) DETECTING GAS OR FUEL LEAKS IN A GAS TURBINE ENGINE

(71) Applicant: Pratt & Whitney Canada Corp., Longueuil (CA)

(72) Inventors: Safi Nizami, Mississauga (CA); Andrew Roach, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 273 days.

(21) Appl. No.: 18/472,694

(22) Filed: Sep. 22, 2023

(65) Prior Publication Data

US 2025/0101879 A1 Mar. 27, 2025

(51) Int. Cl.
*G01M 15/14* (2006.01)
*F01D 21/00* (2006.01)
*B64D 45/00* (2006.01)

(52) U.S. Cl.
CPC ........... *F01D 21/003* (2013.01); *G01M 15/14* (2013.01); *B64D 2045/0085* (2013.01); *F05D 2260/80* (2013.01)

(58) Field of Classification Search
None
See application file for complete search history.

(56) References Cited

U.S. PATENT DOCUMENTS

| | | | |
|---|---|---|---|
| 7,062,370 B2 | 6/2006 | Vhora et al. | |
| 11,421,606 B2 | 8/2022 | Lamarre et al. | |
| 2008/0103703 A1* | 5/2008 | Tichborne | G01F 9/008 |
| | | | 702/51 |
| 2018/0319510 A1* | 11/2018 | Danielson | G01C 23/00 |
| 2019/0128780 A1 | 5/2019 | Pilon et al. | |
| 2020/0224551 A1* | 7/2020 | Zhu | F01D 21/14 |
| 2024/0043137 A1* | 2/2024 | Witalis | G01M 15/14 |
| 2025/0100705 A1* | 3/2025 | Minas | B64D 37/32 |

OTHER PUBLICATIONS

Search Report issued in European Patent Application No. 24201997.4; Date of Mailing Feb. 10, 2025 (10 pages).

* cited by examiner

*Primary Examiner* — Alexander A Mercado
(74) *Attorney, Agent, or Firm* — CANTOR COLBURN LLP

(57) ABSTRACT

An aircraft engine diagnostic system includes at least one sensor and a diagnostic controller. The at least one sensor measures a parameter of a gas turbine engine. The diagnostic controller is in signal communication with the at least one sensor. The diagnostic controller determines an actual thrust output of the gas turbine engine and an execution of at least one control system limiter configured to limit control of the gas turbine engine based on the measured parameter. The diagnostic controller further determines an existence of an engine fault based on the actual thrust output of the gas turbine engine and an execution of the at least one control system limiter.

18 Claims, 4 Drawing Sheets

DETECTING GAS OR FUEL LEAKS IN A GAS TURBINE ENGINE

BACKGROUND

The subject matter disclosed herein generally relates to aircraft engines, and more particularly, to detecting gas or fuel leaks in a gas turbine engine cause by an inability to close loop on power, concurrent with continuous operation on control system limiting loop(s).

Aircraft gas turbine engines may experience a close loop on power engine fault, where the engine is unable properly control its power output or adjust the engine's power output to a desired level. In case of a closed-loop controller, as the engine continues to operate, it can reach one or more of its control system limiters. The continued operation of the engine under these conditions can be used as a cue for gas or fuel leaks that have the potential for causing damage to the engine.

SUMMARY

According to a non-limiting embodiment, an aircraft engine diagnostic system includes at least one sensor and a diagnostic controller. The at least one sensor measures a parameter of a gas turbine engine. The diagnostic controller is in signal communication with the at least one sensor. The diagnostic controller determines an actual thrust output of the gas turbine engine and an execution of at least one control system limiter configured to limit control of the gas turbine engine based on the measured parameter. The diagnostic controller further determines an existence of an engine fault based on the actual thrust output of the gas turbine engine and an execution of the at least one control system limiter.

In addition to one or more of the features described above, or as an alternative to any of the foregoing embodiments, determining the actual thrust output comprises determining the actual thrust output during a steady state thrust condition of the gas turbine engine; and determining an existence of a thrust output deficit in response to the actual thrust failing to meet a target thrust setpoint for the steady state thrust condition.

In addition to one or more of the features described above, or as an alternative to any of the foregoing embodiments, the determining the execution of the at least one control system limiter includes determining an execution time of the at least one control system limiter and comparing the execution time to a time period threshold.

In addition to one or more of the features described above, or as an alternative to any of the foregoing embodiments, the diagnostic controller is a closed loop controller configured to determine a persistent operation of the at least one control system limiter in response to the execution time exceeding the time period threshold.

In addition to one or more of the features described above, or as an alternative to any of the foregoing embodiments, the diagnostic controller determines the existence of the engine fault in response to detecting both the thrust output deficit and the persistent operation on the at least one control system limiter.

In addition to one or more of the features described above, or as an alternative to any of the foregoing embodiments, the engine fault includes at least one of a gas leak and a fuel leak.

In addition to one or more of the features described above, or as an alternative to any of the foregoing embodiments, the diagnostic controller determines a presence of at least one of the fuel leak and the gas leak in the gas turbine due to a persistent inability to close loop on power concurrent with operation on the at least one control system limiter.

In addition to one or more of the features described above, or as an alternative to any of the foregoing embodiments, the diagnostic controller outputs a fault bit in response to detecting the engine fault In addition to one or more of the features described above, or as an alternative to any of the foregoing embodiments, diagnostic controller generates an alert in response to detecting the engine fault to indicate the presence of at least one of the fuel leak and the gas leak.

In addition to one or more of the features described above, or as an alternative to any of the foregoing embodiments, the at least one control system limiter includes at least one of a fuel flow limiter and an engine generator speed limiter.

According to another non-limiting embodiment, a method of determining an engine fault is provided. The method comprises measuring a parameter of a gas turbine engine using at least one sensor, determining by a diagnostic controller an actual thrust output of the gas turbine engine, and determining by the diagnostic controller an execution of at least one control system limiter configured to limit control of the gas turbine engine based on the measured parameter. The method further comprises determining by the diagnostic controller an existence of an engine fault based on the actual thrust output of the gas turbine engine and an execution of the at least one control system limiter.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
FIG. 1 is an illustration of a traditional closed-loop controller.
Figure 1:
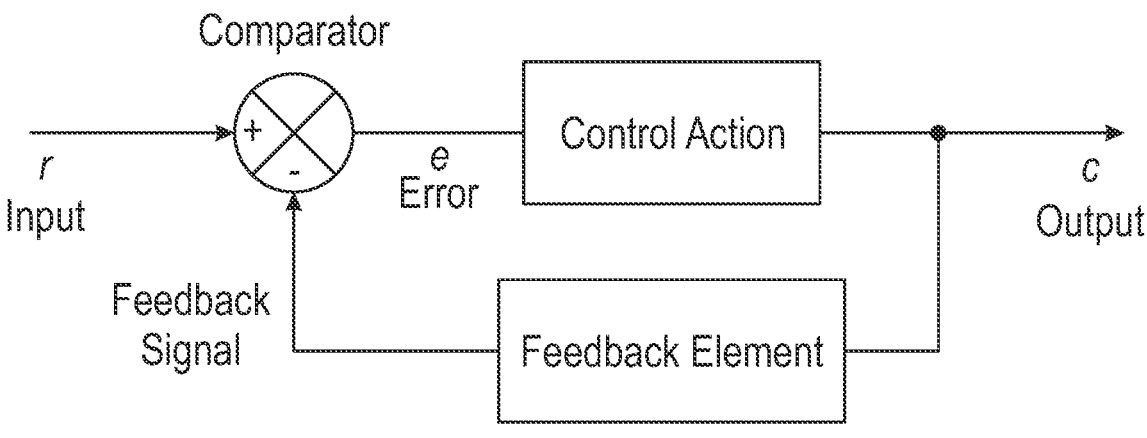

Traditional FADEC-operated gas turbine engines typically employ closed-loops (or feedback control systems), which are typically referred to as "closed-loop controllers." An example of a traditional closed-loop controller 10 is illustrated in FIG. 1. A traditional closed-loop controller 10 operates as the primary means to operate the engine at a target thrust set point (e.g. N1, EPR or Power). The FADEC closed-loop scheme facilitated by the control-loop controller 10 will continuously calculate an error term (e) as the difference between the target setpoint (r) and the actual output (c). When the difference in the error term is not bridged over time, the FADEC will continue to increase the effector output (c), which in a gas turbine engine is primarily the fuel flow (WF), until either the target thrust setpoint is met, or a fault protection or control limit (e.g., fuel flow limiter) is invoked.

In order to protect the engine, the FADEC typically incorporates a series of nested loops which impose a control limit (often referred to as a "control system limiter" or simply a "limiter") on some of the key engine parameters. These engine parameters include, but are not limited to, Rotor speeds (N1, N2, NH, NL, NP, NR, etc), Fuel Flow (WF), Power, Torque, Exhaust Pressure Ratio (EPR), Compressor Pressure (P3, Fuel/Air ratio (WF/P3), and Inter Turbine Temperature (ITT). When the target thrust target is not met, however, the FADEC will continue to operate the engine (e.g., increase fuel flow to the engine) until it is limited by one of the control limits mentioned above (e.g., by a fuel flow limiter).

Various non-limiting embodiments described herein provide an aircraft engine diagnostic system configured to monitor closed loop on power (CLoP) along with continuous operation of one or more limiter(s) while at steady state power to detect an engine fault. The engine fault described herein includes, but is not limited to, fuel leaks and/or gas leaks that occur in a gas turbine engine. Unlike traditional FADECs, the aircraft diagnostic system can employ a diagnostic controller (e.g., Central Maintenance Computer (CMC)) capable of detecting and indicating when the engine is unable to close loop on power concurrent with operation on one of the limiters. In one or more non-limiting embodiments, the diagnostic controller can confirm the occurrence of an engine fault in response to detecting a persistent operation on any of the aircraft limiters (e.g., the fuel limiter, NH limiter, etc.) during steady state conditions (i.e. with no change to the target thrust setpoint) along with detecting an inability to close loop on the target thrust parameter. In response to confirming the existence of the Engine fault, the diagnostic controller can set or output a CLOP bit, which in turn generates an engine fault indicator and/or CAS (Crew Alerting System) Message to be output (e.g., to the flight deck). Accordingly, the aircraft engine diagnostic system of the present disclosure can aid in mitigating damaging effects of gas and/or fuel leaks and offer better fault isolation for maintenance purposes.

Figure 2:
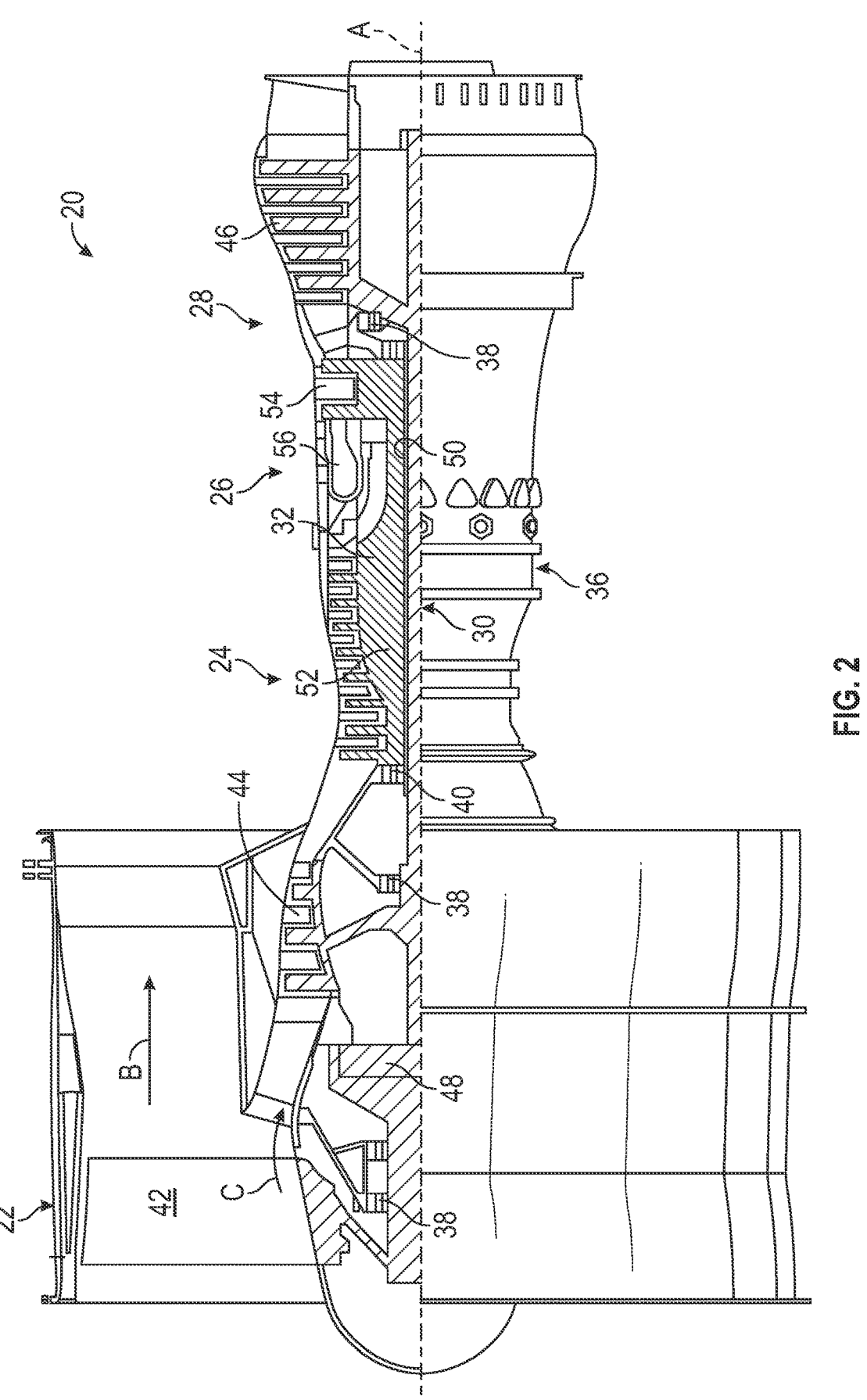
FIG. 2 is a schematic cross-sectional illustration of a gas turbine engine architecture according to a non-limiting embodiment of the present disclosure.

Turning now to FIG. 2, a gas turbine engine 20 is schematically depicted according to a non-limiting embodiment of the present disclosure. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, the concepts described herein are not limited to use with two-spool turbofans as the teachings may be applied to other types of turbine engines, including three-spool architectures.

The exemplary engine 20 generally includes a low-speed spool 30 and a high-speed spool 32 mounted for rotation about an engine central longitudinal axis A relative to an engine static structure 36 via several bearing systems 38. In some embodiments, various bearing systems 38 at various locations may alternatively or additionally be provided, and the location of bearing systems 38 may be varied as appropriate to the application.

The low-speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low-speed spool 30. The high-speed spool 32 includes an outer shaft 50 that interconnects a high pressure compressor 52 and high pressure turbine 54. A combustor 56 is arranged in exemplary gas turbine engine 20 between the high-pressure compressor 52 and the high-pressure turbine 54. An engine static structure 36 is arranged generally between the high-pressure turbine 54 and the low-pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low-pressure compressor 44 then the high-pressure compressor 52, mixed and burned with fuel in the combustor 56, then expanded over the high pressure turbine 54 and low pressure turbine 46. In some embodiments, stator vanes 45 in the low-pressure compressor 44 and stator vanes 55 in the high-pressure compressor 52 may be adjustable during operation of the gas turbine engine 20 to support various operating conditions. In other embodiments, the stator vanes 45, 55 may be held in a fixed position. The turbines 46, 54 rotationally drive the respective low speed spool 30 and high-speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. It should be understood, however, that the above parameters are only exemplary of one embodiment of a geared architecture engine and that the present disclosure is applicable to other gas turbine engines including direct drive turbofans.

Figure 3:
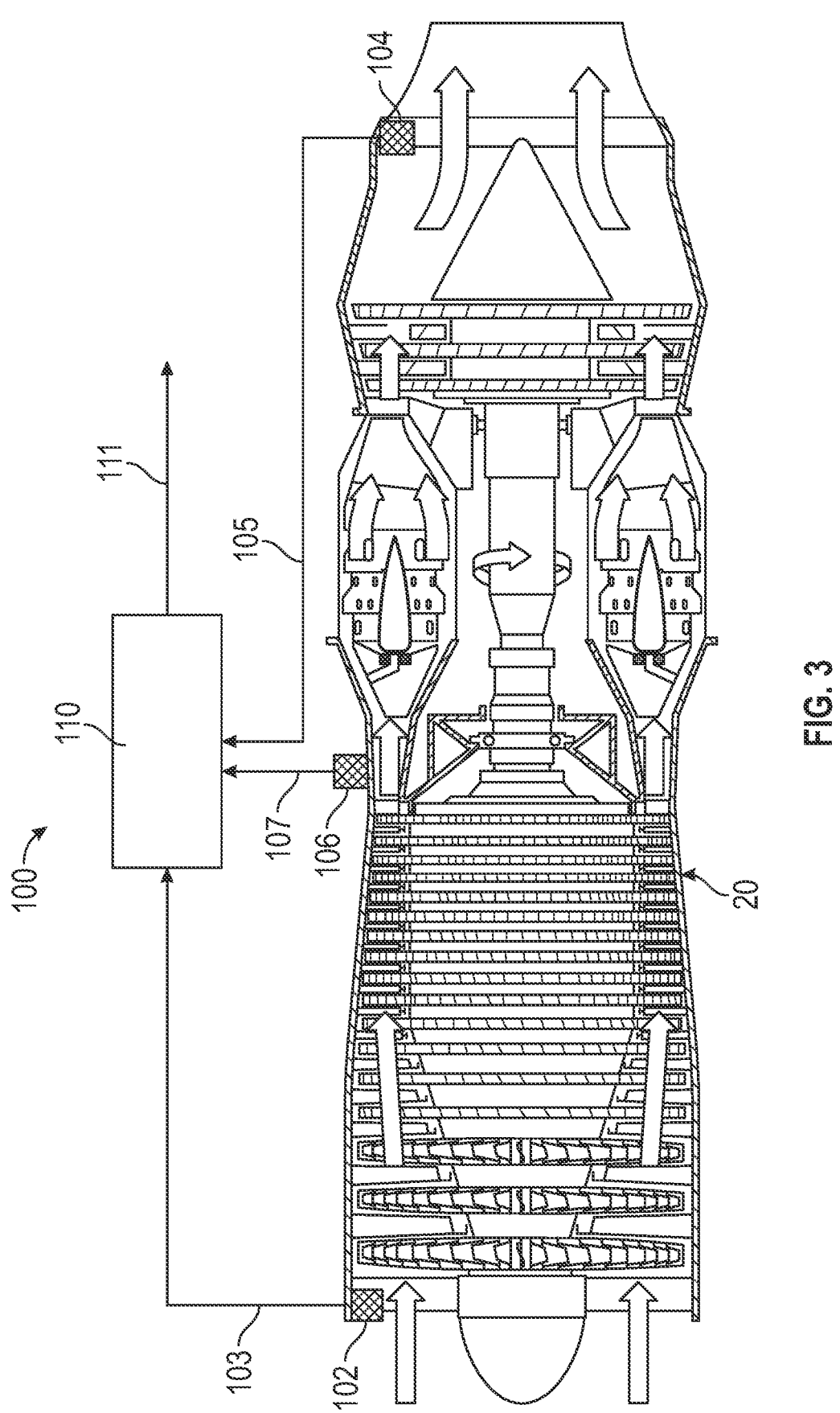
FIG. 3 depicts an aircraft engine diagnostic system according to a non-limiting embodiment of the present disclosure.

Turning now to FIG. 3, an aircraft or engine diagnostic system 100, such as a FADEC or CMC configured to detect the presence of a fault in a gas turbine engine 20 is illustrated according to a non-limiting embodiment. The engine fault described herein includes as a close loop on power engine fault, it should be appreciated that the aircraft engine diagnostic system 100 may detect other faults associated with the gas turbine engine without departing from the scope of the invention.

The aircraft engine diagnostic system 100 includes one or more inlet sensors 102, one or more outlet sensors 104, one or more engine operation sensors 106, and a diagnostic controller 110. Each inlet sensor 102 measures an inlet parameter at the inlet of the engine 20 during engine operation, and outputs an inlet measurement signal 103 indicative of the measured inlet parameter. The inlet sensors can include, but are not limited to, an inlet pressure sensor, an inlet temperature sensor, and an inlet mass airflow sensor. Each outlet sensor 104 measures an outlet parameter at the outlet of the engine 20 during engine operation, and outputs an outlet measurement signal 105 indicative of the measured outlet parameter. The outlet sensors 104 include, but are not limited to, an outlet pressure sensor, an outlet temperature sensor, and an exhaust flow sensor. Each engine operation sensor 106 measures an engine parameter associated with the engine 20 during engine operation, and outputs an operation measurement signal 107 indicative of the measured operation parameter. The engine operation sensors 106 include, but are not limited to, an engine/rotor speed sensor, a vibration sensor, a fuel flow sensor, a fuel injection sensor, a compressor pressure sensor), and an inter-turbine temperature sensor. Although three sensors are illustrated in FIG. 3, it should be appreciated that more or less sensors can be employed in the aircraft engine diagnostic system 100 without departing from the scope of the present disclosure.

The diagnostic controller 110 is in signal communication with each inlet sensor 102, each outlet sensor 104, and each engine operation sensor 106 to receive the inlet measurement signal 103, the outlet measurement signal 105, and the operation measurement signal 107, respectively. The diagnostic controller 110 can be constructed as an electronic hardware controller that includes memory and a processor configured to execute algorithms and computer-readable program instructions stored in the memory. In one or more non-limiting embodiments, the diagnostic controller 110 is implemented as a FADEC. It should be appreciated, however, that other types of aircraft engine controllers can be employed in the aircraft engine diagnostic system 100 without departing from the scope of the present disclosure.

The diagnostic controller 110 can analyze the inlet measurement signals 103, the outlet measurement signals 105, and/or the operation measurement signals 107 to determine an actual thrust output of the engine 20. In one or more non-limiting embodiments, the diagnostic controller 110 determines the actual thrust output based on an engine pressure ratio (EPR), which takes into account both the incoming and outgoing airflows. The diagnostic controller 110 can calculate the EPR as ratio of the total pressure at the engine inlet as indicated by an inlet pressure measurement signal 103 to the total pressure at the exhaust nozzle as indicated by an outlet pressure measurement signal 105.

The logic of the diagnostic controller 100 implements various nested loops (referred to as "limiters"), which impose a control limit on one or more engine parameters. These engine parameters include, but are not limited to, Rotor speeds (N1, N2, NH, NL, NP, NR etc.), Fuel Flow (WF), Power, Torque, Exhaust Pressure Ratio (EPR), Compressor Pressure (P3 etc.), Fuel/Air ratio (WF/P3), and Inter Turbine Temperature (ITT). When a desired thrust (e.g., a target thrust setpoint) is not met for a given operating condition, the fuel flow to the engine can be increased until it is limited by one or more of the engine limiters (e.g., fuel flow limiter).

During operation of the engine, the diagnostic controller 110 can analyze the inlet measurement signals 103, the outlet measurement signals 105, and/or the operation measurement signals 107 to monitor the operation of one or more the limiters or "nested loops." In this manner, the diagnostic controller 110 can not only detect persistent operation or execution of any of the limiters (e.g., a nested loop that executes for a time period exceeding a time period threshold) during steady state conditions (i.e. with no change to a target thrust setpoint), but may also detect an abnormal inability to close loop on the target thrust parameter. Steady state conditions can be determined to exist when a power or thrust reference does change by more than certain amount (e.g. 0.5% per second) for a set time period of time (e.g., 15 seconds).

The loss of air or gas results in a loss of system pressure or airflow, thereby causing an inability for the actual thrust output to meet the target thrust setpoint. As a result, one or more limiters are unable to close loop on the target thrust parameter and will abnormally continue executing for a time period that is longer than expected (e.g., that exceeds an execution time threshold). Accordingly, the diagnostic controller 110 according to various non-limiting embodiment of the present disclosure can confirm the presence of an engine fault in response to detecting the persistent execution of one or more limiters and the inability of a limiter to close loop on a target thrust set point during a steady state thrust or steady state power demand operating state. In response to confirming the presence of the engine fault, the diagnostic controller can set an engine fault bit and/or output an engine fault signal that invokes a fault alert. The fault alert can include, for example, an audio alert, display alert, and/or haptic alert indicating the existence of the engine fault. The diagnostic controller can also generate a maintenance alert indicating that a maintenance operation is necessary to resolve the detected engine fault.

According to a non-limiting embodiment, the diagnostic controller 110 employs a unique control logic that can confirm the existence of an engine fault based on a set of diagnostic conditions. In one or more non-limiting embodiments, the diagnostic controller 110 can detect the presence of an engine fault when all of the following conditions are met continuously for a set duration of time (i.e., a time period threshold):

1) the engine 20 is operating at steady state thrust or steady state power demand;
2) an output thrust or output power deficit exists;
3) the engine 20 is operating under the control of one or more limiters; and
4) one or more of the limiters are persistently executing for a time period that exceeds an expected time period threshold ($t_{th}$).

In one or more non-limiting embodiments, the existence of an output thrust or output power deficit can be determined. In some non-limiting embodiment, the existence of an output thrust or output power deficit can be determined as a horsepower error percentage (e.g., 1%) while the engine operates at steady-state power. In any case, the limiters invoked to control the engine can include, for example, a maximum rotor speed limiter and/or a fuel flow limiter. The expected time period threshold (tth)) can be, for example, about 5 seconds.

The expected time period threshold (tth)) of persistence time during which the limiter (e.g., the nested loop) executes in response to the occurrence of an engine fault can be determined either analytically or from test data based on the worst-case time to accelerate from idle to max power across the engine/aircraft flight envelope, and padded with an extra margin.

In one or more non-limiting embodiments, the diagnostic controller 110 (e.g., the controller logic) can be fine-tuned based on the type of limiter invoked. For example, continuous operation on a fuel flow limiter may be indicative of a downstream fuel leak, or a combustor gas path leak upstream of the turbine stages. In another example, continuous operation on the rotor speed limiter (e.g., the N2 limiter) can be indicative of leaks in the compressor stages or malfunction of a bleed off valve (BOV) installed in the engine 20 and/or poor health of a compressor stage (e.g., caused by foreign object debris (FOD) or FOD damage). Thus, the fault logic described herein can be indicative of a gas leak and/or fuel leak in the gas turbine engine 20.

Figure 4:
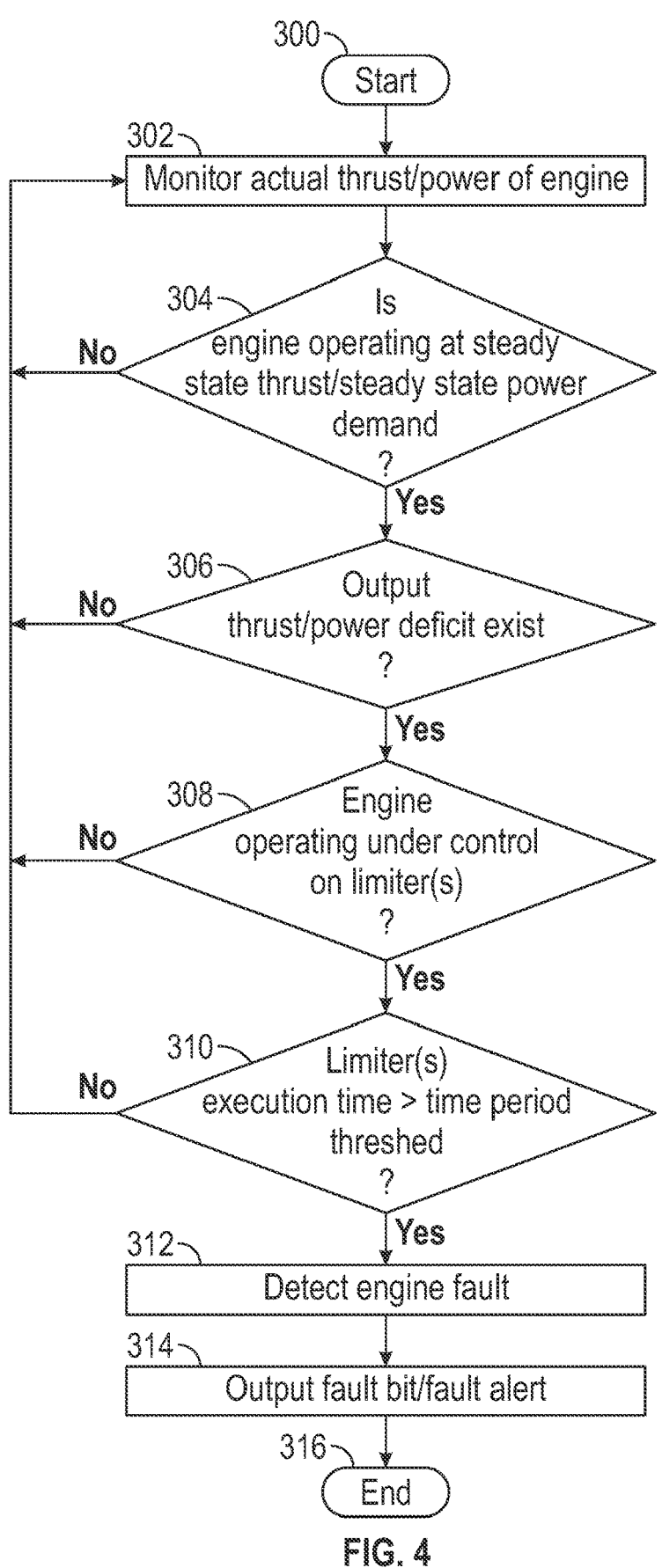
FIG. 4 is a flow diagram illustrating a method of detecting an engine fault according to a non-limiting embodiment of the present disclosure.

Turning now to FIG. 4, a method of detecting an engine fault is illustrated according to a non-limiting embodiment of the present disclosure. The method begins at operation 300, and monitors an actual thrust output or power output of an aircraft gas turbine engine at operation 302. At operation 304, a determination is made as to whether the gas turbine engine is operating at steady state thrust or steady state power demand When the engine operates at steady state thrust or steady state power demand, the method returns to operation 302 and continues monitoring the actual thrust output or actual power output of the engine. When, however, the engine does not operate at steady state thrust or steady stat power demand, the method proceeds to operation 306 and determines whether an output thrust deficit or output power deficit exists, When an output thrust deficit or output power deficit does not exist, the method returns to operation 302 and continues monitoring the actual thrust output or actual power output of the engine. When, however, an output thrust deficit or output power deficit exists, the method proceeds to operation 308 and determines whether the engine is operating under control of a limiter (e.g. a nested loop). When the engine is not operating under control of a limiter, the method returns to operation 302 and continues monitoring the actual thrust output or actual power output of the engine. When, however, the engine is operating under control of a limiter, the method proceeds to operation 310 and determines whether the execution time of the limiter exceeds a time period threshold. When the execution time of the limiter does not exceed the time period threshold, the method returns to operation 302 and continues monitoring the actual thrust output or actual power output of the engine. When, however, the execution time of the limiter exceeds the time period threshold, an engine fault (e.g., gas or fuel leak) is detected at operation 312. At operation 314, a fault bit and/or a fault alert is generated indicating the existence of the engine fault (e.g., a fuel leak and/or a gas leak), and the method ends at operation 316.

As described herein, various non-limiting embodiments described herein provide an aircraft engine diagnostic system configured to detect an engine fault such as, for example, a fuel leak and/or gas leak fault associated with an aircraft gas turbine engine. The aircraft engine diagnostic system includes a controller configured to set an engine fault bit to indicate when the engine is unable to close loop on power due to an engine fault (e.g., excessive operation of the engine at maximum rotor speed and/or wrongful operation of the fuel flow limiter). Accordingly, the aircraft engine diagnostic system can aid in mitigating damaging effects of over-fueling and offer better fault isolation for maintenance purposes that may result from the occurrence of an engine fault.

As used herein, the terms "about" and "substantially" are intended to include the degree of error associated with measurement of the particulate quantity based upon the equipment available at the time of filing the application. For example, the terms may include a range of +8%, or 5%, or 2% of a given value or other percentage change as will be appreciated by those of skill in the art for the particulate measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description but is only limited by the scope of the appended claims.

What is claimed is:

1. An aircraft engine diagnostic system comprising:
at least one sensor configured to measure a parameter of a gas turbine engine; and
a diagnostic controller in signal communication with the at least one sensor, the diagnostic controller configured to determine an actual thrust output of the gas turbine engine and an execution of at least one control system limiter configured to control the fuel flow to the engine so to limit control of the gas turbine engine based on the measured parameter,
wherein the diagnostic controller is a closed loop controller configured to determine a persistent operation of the at least one control system limiter in response to the execution time exceeding the time period threshold, and
wherein the diagnostic controller determines an existence of an engine fault based on the actual thrust output of the gas turbine engine and an execution of the at least one control system limiter, in response to detecting the persistent operation of the at least one control system limiter and the actual thrust output failing to meet a target thrust parameter.

2. The aircraft engine diagnostic system of claim 1, wherein determining the actual thrust output comprises:
determining the actual thrust output during a steady state thrust condition of the gas turbine engine; and
determining an existence of a thrust output deficit in response to the actual thrust failing to meet a target thrust setpoint for the steady state thrust condition.

3. The aircraft engine diagnostic system of claim 2, wherein the determining the execution of the at least one control system limiter includes determining an execution time of the at least one control system limiter and comparing the execution time to a time period threshold.

4. The aircraft engine diagnostic system of claim 3, wherein the diagnostic controller determines the existence of the engine fault in response to detecting both the thrust output deficit and the persistent operation on the at least one control system limiter.

5. The aircraft engine diagnostic system of claim 4, wherein the diagnostic controller determines at least one of a gas leak and a fuel leak in response to detecting the persistent operation of the at least one control system limiter and the actual thrust output failing to meet the target thrust parameter.

6. The aircraft engine diagnostic system of claim 5, wherein the diagnostic controller determines a presence of at least one of the fuel leak and the gas leak in the gas turbine due to a persistent inability to close loop on power concurrent with operation on the at least one control system limiter.

7. The aircraft engine diagnostic system of claim 6, wherein the diagnostic controller outputs a fault bit in response to detecting the engine fault.

8. The aircraft engine diagnostic system of claim 6, wherein diagnostic controller generates an alert in response to detecting the engine fault to indicate the presence of at least one of the fuel leak and the gas leak.

9. The aircraft engine diagnostic system of claim 6, wherein the at least one control system limiter includes at least one of a fuel flow limiter and an engine generator speed limiter.

10. A method of determining an engine fault, the method comprising:
   measuring a parameter of a gas turbine engine using at least one sensor; and
   determining, by a diagnostic controller, an actual thrust output of the gas turbine engine;
   controlling a fuel flow to the gas turbine engine based on an execution of at least one system limiter;
   determining, by the diagnostic controller, the execution of the at least one control system limiter configured to limit control of the gas turbine engine based on the measured parameter,
   determining, by the diagnostic controller, an existence of an engine fault based on the actual thrust output of the gas turbine engine and an execution of the at least one control system limiter, following a persistent operation of the at least one control system limiter that is detected in response to the execution time of the at least one control system limiter exceeding the time period threshold and the actual thrust output failing to meet a target thrust parameter.

11. The method of claim 10, wherein determining the actual thrust output comprises:
   determining the actual thrust output during a steady state thrust condition of the gas turbine engine; and
   determining an existence of a thrust output deficit in response to the actual thrust failing to meet a target thrust setpoint for the steady state thrust condition.

12. The method of claim 11, wherein determining the execution of the at least one control system limiter includes determining an execution time of the at least one control system limiter and comparing the execution time to a time period threshold.

13. The method of claim 11, further comprising determining the existence of the engine fault in response to detecting both the thrust output deficit and the persistent operation on the at least one control system limiter.

14. The method of claim 13, wherein determining the engine fault includes determining at least one of a gas leak and a fuel leak in response to detecting a persistent operation of the at least one control system limiter and the actual thrust output failing to meet the target thrust parameter.

15. The method of claim 13, further comprising determining a presence of at least one of the fuel leak and the gas leak in the gas turbine due to a persistent inability to close loop on power concurrent with operation on the at least one control system limiter.

16. The method of claim 15, further comprising outputting, from the diagnostic controller, a fault bit in response to detecting the engine fault.

17. The method of claim 15, further comprising generating, by the diagnostic controller, an alert in response to detecting the engine fault to indicate the presence of at least one of the fuel leak and the gas leak.

18. The method of claim 15, wherein determining the execution of at least one control system limiter includes determining a persistent execution of at least one of a fuel flow limiter and an engine generator speed limiter while at steady state power.

* * * * *